United States Patent
Epple

(10) Patent No.: US 9,393,937 B2
(45) Date of Patent: Jul. 19, 2016

(54) METHOD FOR OPERATING A BRAKING SYSTEM OF A VEHICLE, BRAKING SYSTEM

(75) Inventor: Stefan Epple, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1202 days.

(21) Appl. No.: 12/960,099

(22) Filed: Dec. 3, 2010

(65) Prior Publication Data

US 2011/0132702 A1 Jun. 9, 2011

(30) Foreign Application Priority Data

Dec. 8, 2009 (DE) .......................... 10 2009 047 615

(51) Int. Cl.
| | |
|---|---|
| *B60T 7/12* | (2006.01) |
| *B60T 7/04* | (2006.01) |
| *B60T 7/14* | (2006.01) |
| *B60T 8/32* | (2006.01) |

(52) U.S. Cl.
CPC . *B60T 7/042* (2013.01); *B60T 7/14* (2013.01); *B60T 8/3275* (2013.01)

(58) Field of Classification Search
USPC ............. 303/20, 154, 155, 191, 113.4, 114.1, 303/114.2, 114.3; 188/355, 356, 357, 358, 188/359, 360
See application file for complete search history.

(56) References Cited

U.S. PATENT DOCUMENTS

| | | | | |
|---|---|---|---|---|
| 5,158,343 A | * | 10/1992 | Reichelt et al. ............ | 303/113.4 |
| 5,513,906 A | * | 5/1996 | Steiner ......................... | 303/125 |
| 5,535,123 A | * | 7/1996 | Rump et al. .................... | 701/78 |
| 5,727,854 A | | 3/1998 | Pueschel et al. | |
| 2008/0033622 A1 | * | 2/2008 | Groitzsch et al. .............. | 701/70 |

FOREIGN PATENT DOCUMENTS

| | | |
|---|---|---|
| DE | 195 24 939 | 1/1997 |
| JP | 7-156786 | 6/1995 |
| JP | 7-156787 | 6/1995 |
| JP | 9-95232 | 4/1997 |

* cited by examiner

*Primary Examiner* — Thomas J Williams
(74) *Attorney, Agent, or Firm* — Norton Rose Fulbright US LLP

(57) ABSTRACT

A method for operating a braking system of a vehicle, particularly of a motor vehicle, is described in which an automatic braking process is triggered by the exceeding of a specifiable threshold value by a rate of change conditioned upon the operation of a brake pedal. It is provided, in this context, that the threshold value is specified/varied by the driver in an initialization operation of the braking system. Also described is a related braking system.

8 Claims, 2 Drawing Sheets

METHOD FOR OPERATING A BRAKING SYSTEM OF A VEHICLE, BRAKING SYSTEM

RELATED APPLICATION INFORMATION

The present application claims priority to and the benefit of German patent application no. 10 2009 047 615.6, which was filed in Germany on Dec. 8, 2009, the disclosure of which is incorporated herein by reference.

FIELD OF THE INVENTION

The present invention relates to a method for operating a braking system of a vehicle, especially a motor vehicle, an automatic braking process being triggered by a rate of change, conditioned upon the operation of a brake pedal, which exceeds a specifiable threshold value. The present invention also relates to a braking system for a vehicle, especially a motor vehicle, particularly for carrying out the above-mentioned method, having at least one brake pedal and at least one braking device that is controllable by the brake pedal, and having means for recording a rate of change conditioned upon the operation of the brake pedal, as well as having a device for comparing the recorded rate of change to a specifiable threshold value.

BACKGROUND INFORMATION

Methods for operating braking systems as well as corresponding braking systems of the type named at the outset are known from the related art. Systems and methods are known especially under the concept of braking assistant, which support the driver during braking in emergency situations. It is provided, in this context, that the braking system automatically initiates full braking when it is recognized that the driver is in a dangerous situation, and that as quick as possible a braking should be achieved, that is, as short a length of brake path as possible. As is well known, the emergency situation is detected in that a rate of change conditioned upon the operation of a brake pedal of the braking system is recorded and is compared to a specifiable threshold value.

Thus, it is Laid-Open German patent document DE 195 24 939 A1, for example, indicates that one may use the rate of change in the pressure in a hydraulic braking system of the braking system as the decisive criterion for initiating an automatic braking process. If the driver operates the brake pedal especially fast, and using great force, a high rate of change comes about in the pressure in the hydraulic braking system thereby acted upon. If the rate of change exceeds the specifiable threshold value, which was specified before the vehicle, or rather the braking system, was put into operation, the automatic braking process is triggered.

SUMMARY OF THE INVENTION

Now, the method according to the present invention provides that the threshold value in an initialization operation of the braking system, that is able to be initiated by the driver, be specified by the driver. It is thus provided that the driver himself be able to specify the threshold value himself at any time. If the vehicle is delivered having a braking system in which the threshold value, the so-called standard threshold value, is specified, after initiating the initialization operation, the driver is able to vary the standard threshold value, or rather specify a new threshold value. This has the advantage that the braking assistant or the braking system is able to be adapted individually to the driver of the vehicle. Thereby it may be ensured that even a vehicle driver, to whom it is possible only with difficulty to exceed the standard threshold, is able to trigger the automatic braking process in an emergency. In addition, the driver or the operator of the vehicle becomes sensitized to the braking assistant. The operator of the vehicle is able to learn, in an initialization operation, how he has to operate the brake pedal so as to trigger the automatic braking process, without having to carry out dangerous driving maneuvers on the open road, to do this.

In the initialization operation, the threshold value is advantageously specified by operating the brake pedal. Because of this, it is possible for the driver, in a particularly simple manner, to set a threshold value that is optimum for him, since he interacts directly with the braking system and consequently gets a feel for the braking system and the threshold value. He can thus test his own potentialities in a simple manner. In the initialization operation, it is expediently signaled to the driver, especially visually and/or acoustically, whether the rate of change, conditioned on the operation of the brake pedal, has reached the standard threshold value and/or the threshold value up to now.

The threshold value is expediently specified as a function of the recorded rate of change when the brake pedal is operated in the initialization operation. Thus the rate of change produced by the driver is recorded in the initialization operation, and the threshold value is set as a function of it. The rate of change is advantageously the pressure buildup in a hydraulic braking system. Alternatively or in addition, however, the rate of change may also be the motion of the brake pedal (brake pedal path) which is recorded using a suitable sensor system.

Furthermore, it is provided that the threshold value specified by the driver is taken over if it is within a specifiable boundary range. Thus, advantageously, a minimum value is specified below which the threshold value specified by the driver must not fall. The basic function of the braking assistant is thereby assured, so that the braking assistant, for example, cannot be set too sensitively by specifying a very small threshold value, thereby leading to an unwantedly strong braking procedure which could also result in an accident.

The initialization operation is advantageously initiated by the driver by operating an operating element at a standstill of the vehicle. Thus, by operating the operating element, which may be, for instance, a switch provided for this or even an operating element that is already present, the driver is able to initiate the initialization operation.

The accelerator of the vehicle may be used particularly as the operating element. Thus, the initialization operation is initiated by operating the accelerator. The duration of the accelerator operation and the pedal path of the accelerator are advantageously recorded, and compared to appropriate comparative values. Only when the accelerator has been operated for a specifiable time span, is the initialization operation initiated, using a specifiable pedal path.

Moreover, it is provided that the initiated initialization operation is released when the brake pedal is operated in such a way that the rate of change conditioned thereby exceeds the threshold value. For one thing, this is used as a control function for the threshold value of the braking system actually being changed. On the other hand, it permits the driver to get a feel for the threshold value up to now. It may be signaled to the driver visually or acoustically that, in operating the brake pedal, he has exceeded the threshold value. The rate of change that has taken place by the operation may have to be in a specifiable boundary range, to be assumed to be an activation command for the initialization operation. This offers additional assurance that permits one clearly to conclude whether the initialization operation is actually wanted. All in all, because of the advantageous method, the driver is able to take a part in increasing the active safety of his vehicle, and the attractiveness of such braking assistance systems or braking systems is raised. It is conceivable that the driver might set the threshold value in stepless fashion or stepwise, by operating the brake pedal in the initialization operation.

The braking system according to the present invention is distinguished by the fact that the threshold value is specifiable by the driver in an initialization operation of the braking system. Consequently, the braking system makes it possible in a simple manner that the threshold value, which is used for the triggering of the automatic braking function, is variable or specifiable by the driver.

Furthermore, it is provided that the threshold value is specifiable by operating the brake pedal in the initialization operation. Thus it is not asked of the driver to work his way through, for example, the menus of an onboard computer, so as to vary the threshold value there. Rather, it is possible for the driver to adapt the threshold value individually directly to his needs or desires, by kicking the brake pedal.

Finally, an operating element is provided that is operable by the driver for initiating the initialization operation. The operating element may be an element operated manually, such as a mechanical switch that is sensitive to touch or works without contact, or even an element operated by foot, especially the accelerator of the vehicle. It is also conceivable to provide means that enable initiating the initialization operation by a voice command.

In the following text, the exemplary embodiments and/or exemplary methods of the present invention is to be elucidated in greater detail with the aid of the drawings.

DETAILED DESCRIPTION

Figure 1:
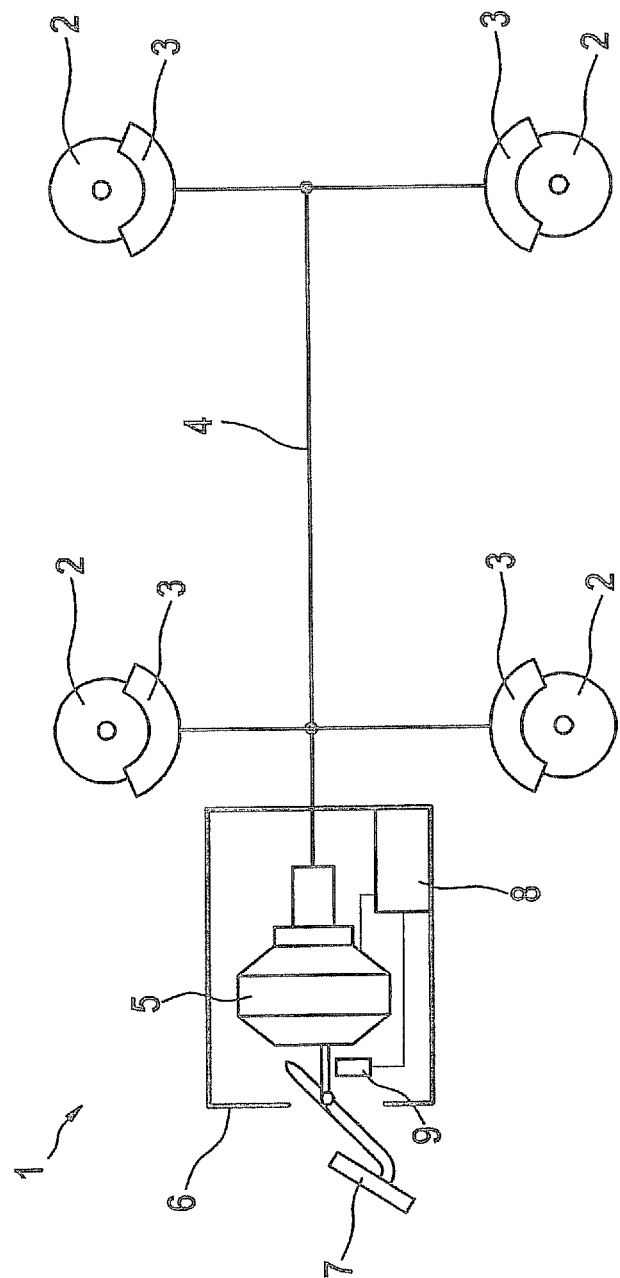
FIG. 1 shows an exemplary embodiment of a braking system in a schematic representation.

In a schematic representation, FIG. 1 shows an exemplary braking system 1 for a motor vehicle which has four wheels 2, a braking device 3, shown in a simplified manner, being allocated to each of wheels 2. Braking devices 3 are developed as hydraulic brake cylinders and are connected to a main brake cylinder 5 of a brake unit 6 via a hydraulic line system 4. In principle, braking systems acting differently are naturally also conceivable, such as electromechanical braking systems. Furthermore, a brake pedal 7 is assigned to braking unit 6, which is able to be operated by a driver of the motor vehicle. A pressure may be generated when operating brake pedal 7 in a manner known to one skilled in the art, by which braking devices 3 or the brake cylinders are operated for slowing down the rotational motion of wheels 2. Even though at this point only one brake circuit is shown, it is naturally also conceivable that, for instance, wheels 2 of a front axle and wheels 2 of a rear axle of the motor vehicle might have pressure applied to them by braking circuits separated from one another.

In dangerous situations it is in the interest of the driver to be able to decelerate the vehicle, using as short a length of brake path as possible. That is why, in the case of danger, he operates the brake pedal very quickly and with great force, whereby the admission pressure in brake unit 6 rapidly becomes very large. In the case in which the driver does, in fact, brake to decelerate very rapidly, but does not apply the brake pressure necessary for an optimal deceleration, a braking assistant unit 8 is provided. Using a suitable sensor, braking assistant unit 8 records the admission pressure applied by brake pedal 7 and/or using a sensor 9, the path of motion of brake pedal 7. As a function of the data recorded, braking assistant unit 8 ascertains a rate of change of the admission pressure or of the pedal path of brake pedal 7. If the rate of change exceeds a specifiable threshold value, an automatic braking process is triggered, in which a very high pressure is built up very rapidly in the brake cylinders. This is able to lead up to the blocking of all the wheels and/or the response of an antilock brake system.

An initialization operation is advantageously able to be initiated, in which the driver of the vehicle is able to change the threshold value. Consequently, the driver has the possibility of individually adapting the threshold value, for triggering the automatic braking process, to his own requirements. Thereby he can ensure that he is able safely to trigger the automatic braking process in a dangerous or a panic situation. The adaptation of the threshold value will be explained in greater detail in the following exemplary embodiment.

Figure 2:
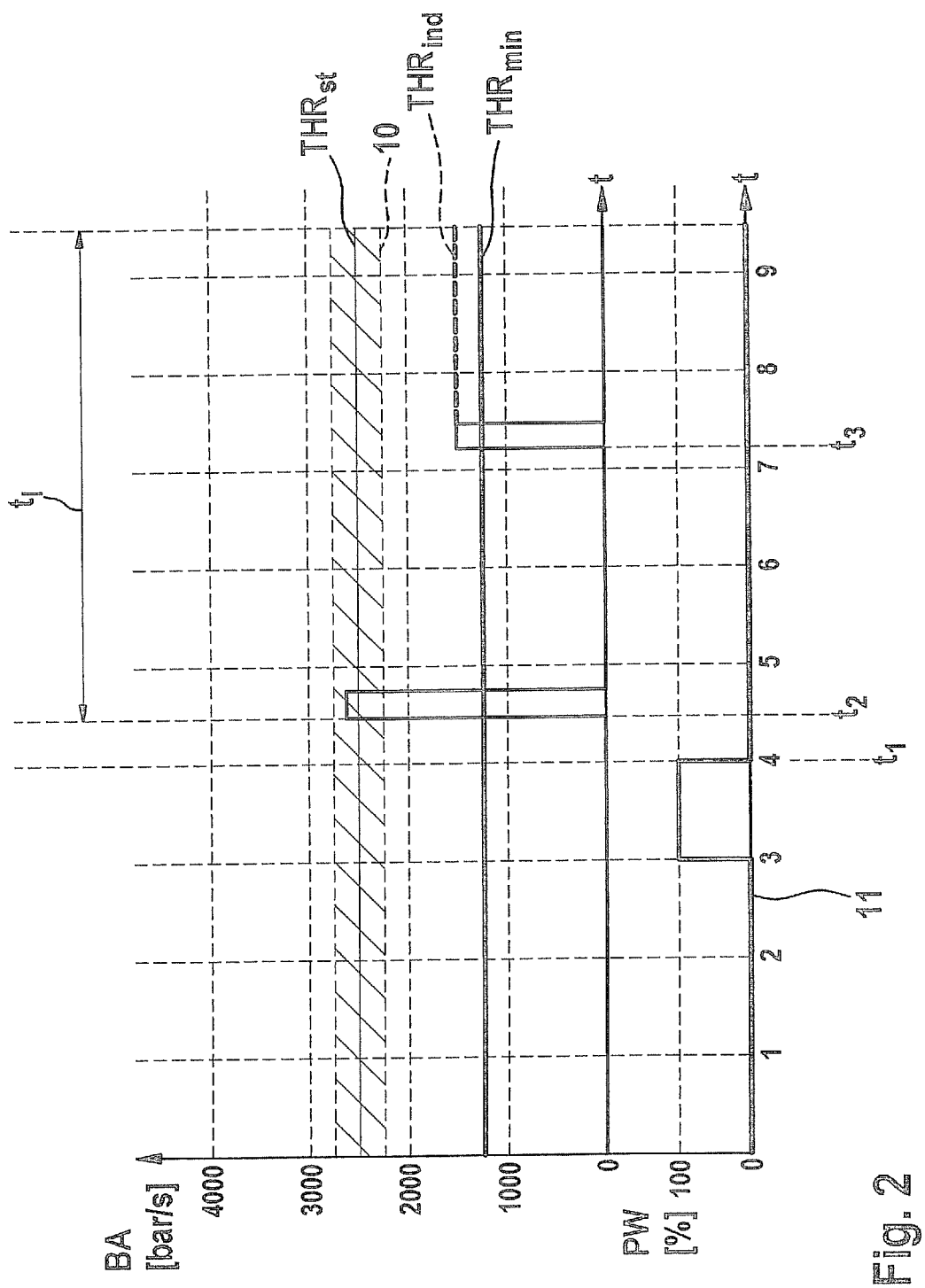
FIG. 2 shows an exemplary embodiment of a method for changing a threshold value of the braking system.

On this topic, FIG. 2 shows an exemplary diagram in which, in the upper section, rate of change BA, conditioned upon the operation of brake pedal 7, in the present case, with reference to the rate of change of a pressure [bar/s] in the hydraulic braking system, and in the lower section, the pedal path PW of an accelerator of the motor vehicle having braking system 1 are each shown plotted against time t. The numerical values shown and described below are purely exemplary.

At a rate of change of approximately 2,500 bar/s, a standard threshold value $THR_{st}$ is drawn in. If standard threshold value $THR_{st}$ is exceeded by operating brake pedal 7, an automatic braking process is triggered, as was described above. Standard threshold value $THR_{st}$ advantageously lies in a tolerance range 10, which is presently shown by dashed lines, and whose function will be discussed in greater detail below.

If the driver wishes to change standard threshold value $THR_{st}$ that is specified by the system, he must first switch the braking system into an initialization operation. For this purpose, it may be provided that the initialization operation is able to be initiated, at standstill of the vehicle, by operating an operating element. The operating element may be a switch provided just for this, or may be the accelerator of the motor vehicle. Thus it is presently provided that the initialization operation is initiated at a time $t_1$, when the driver has previously depressed the accelerator completely for a determinable minimum period, so that a pedal path PW of 100% was recorded over the minimum period. In the present instance, a minimum time of one second is required for this. Line 11 in the lower section of the diagram shows the corresponding curve of pedal path PW over time t.

In order to release the initialization operation, after initiating the initialization operation, the driver first has to operate brake pedal 7 in such a way that rate of change BA exceeds the standard threshold value or the previous threshold value, and/or lies within tolerance band 10. This has the advantage that the driver gets to know the mechanism for triggering the braking assistant or the automatic braking process and the threshold value set. The exceeding of threshold value $THR_{st}$ or the reaching of tolerance band 10 is expediently signaled to the driver by acoustical and/or visual signals. It is also conceivable to notify the driver of this by displaying a text message. If rate of change BA generated by the driver is within tolerance range 10, then, as shown in FIG. 2, at a time $t_2$ the initialization operation may be released for a time period $t_1$.

Now the driver is able to specify the threshold value himself, by operating brake pedal 7. In the present exemplary embodiment, brake pedal 7 is operated at time $t_3$ in such a way that rate of change BA is approximately 1,500 bar/s. Individual threshold value $THR_{ind}$ thus specified is recorded and stored in braking assistant unit 8. Thereafter, the initialization operation is expediently ended automatically.

A boundary range is advantageously specified, within which the threshold value specified by the driver has to be. Thus, in the present diagram, for example, a lower boundary $THR_{min}$ is drawn in, which the threshold value specified by the driver and the rate of change BA brought about by the driver must not undershoot. If threshold value $THR_{ind}$, that is a function of the operating speed of brake pedal 7, is lower than standard threshold value $THR_{st}$, the latter is taken over up to a fixed boundary value $THR_{min}$ as individual threshold value $THR_{ind}$, and is stored until the next adjustment, advantageously in a nonvolatile memory of braking assistant unit 8. If the threshold value specified by the driver is greater than the standard threshold value, the threshold value specified by the driver is advantageously maintained. But even here, too, an upper boundary may be set, which must not be exceeded by threshold value $THR_{ind}$ that is specified by the driver. If threshold value $THR_{ind}$, specified by the driver, is below lower boundary $THR_{min}$ or above the upper boundary, the standard threshold value or the threshold value prevailing before is maintained. It may additionally be provided that, besides the rate of change, an absolute value may be taken into account, such as the final pressure built up, or the pedal path of the brake pedal.

Thus, all in all, an advantageous braking system is provided, as well as an advantageous method for operating the braking system, which, in a simple way, enable adapting, individually to each driver, the threshold value to the triggering of an automatic braking process.

What is claimed is:

1. A method for operating a braking system of a motor vehicle, the method comprising:
    performing an initialization operation of the braking system in response to a driver input;
    during the initialization operation, recording a rate of change of a signal that varies in dependence on driver operation of a brake pedal and setting a threshold value equal to the rate of change recorded during the initialization operation; and
    triggering an automatic braking process in response to a rate of change of the signal outside of the initialization operation exceeding the threshold value.

2. The method of claim 1, further comprising:
    during the initialization operation, one of visually signaling and acoustically signaling to the driver when the rate of change has reached a previously set threshold value.

3. The method of claim 1, wherein the threshold value is set only if it is within a specifiable boundary range.

4. The method of claim 1, wherein the initialization operation is initiated at standstill of the vehicle by operating an operating element.

5. The method of claim 1, wherein an accelerator of the vehicle is used to trigger the initialization operation.

6. The method of claim 1, wherein during the initialization operation, the setting of the threshold value is enabled only after the brake pedal is operated in such a way that the rate of change exceeds the threshold value.

7. A braking system for a motor vehicle, comprising:
    a brake pedal;
    at least one braking device that is controllable by the brake pedal;
    a recording arrangement that records a rate of change of a signal that varies in dependence on driver operation of the brake pedal; and
    a braking assistant unit that compares the recorded rate of change to a specifiable threshold value, wherein the threshold value is set equal to the rate of change of the signal recorded during an initialization operation of the braking system;
    wherein an automatic braking process is triggered in response to a rate of change of the signal outside of the initialization operation exceeding the threshold value.

8. A device for operating a braking system of a motor vehicle, comprising:
    a specifying arrangement configured to, during an initialization operation of the braking system, record a rate of change of a signal that varies in dependence on driver operation of a brake pedal and set a threshold value equal to the rate of change recorded during the initialization operation; and
    a triggering arrangement configured to trigger an automatic braking process in response to a rate of change of the signal outside of the initialization operation exceeding the threshold value.

* * * * *